(12) United States Patent
Anderson

(10) Patent No.: US 9,971,888 B2
(45) Date of Patent: May 15, 2018

(54) OS SECURITY FILTER

(71) Applicant: ID Integration, Inc., Multikeo, WA (US)

(72) Inventor: Gene Anderson, Seattle, WA (US)

(73) Assignee: ID Integration, Inc., Mukilteo, WA (US)

( * ) Notice: Subject to any disclaimer, the term of this patent is extended or adjusted under 35 U.S.C. 154(b) by 0 days. days.

(21) Appl. No.: 14/214,135

(22) Filed: Mar. 14, 2014

(65) Prior Publication Data

US 2014/0283118 A1   Sep. 18, 2014

Related U.S. Application Data

(60) Provisional application No. 61/794,931, filed on Mar. 15, 2013.

(51) Int. Cl.
*G06F 7/04* (2006.01)
*G06F 17/30* (2006.01)
*H04N 7/16* (2011.01)
*G06F 21/51* (2013.01)

(52) U.S. Cl.
CPC .................................. *G06F 21/51* (2013.01)

(58) Field of Classification Search
CPC .............................. G06F 21/51; G06F 21/6281
See application file for complete search history.

(56) References Cited

U.S. PATENT DOCUMENTS

| | | | |
|---|---|---|---|
| 5,355,497 A * | 10/1994 | Cohen-Levy | G06F 17/30067 |
| 6,523,072 B1 * | 2/2003 | Howarth | G06F 9/544 |
| | | | 709/203 |
| 6,968,003 B1 | 11/2005 | Gonazles et al. | |
| 7,070,091 B2 | 7/2006 | Hepworth et al. | |
| 7,097,099 B2 | 8/2006 | Hepworth et al. | |
| 7,232,072 B1 | 6/2007 | Bunte et al. | |
| 7,392,933 B2 | 7/2008 | Hepworth et al. | |
| 7,487,466 B2 * | 2/2009 | Peters | G06F 3/04817 |
| | | | 715/780 |
| 7,621,453 B2 | 11/2009 | Hepworth et al. | |
| 7,815,121 B2 | 10/2010 | Kotlarsky et al. | |

(Continued)

OTHER PUBLICATIONS

Android Malware Spreads Through QR Code, Oct. 2011, McAfee Labs, 8 pages.

(Continued)

*Primary Examiner* — John B King
*Assistant Examiner* — Darshan Dhruv
(74) *Attorney, Agent, or Firm* — The Juhasz Law Firm

(57) ABSTRACT

A system and method for protecting against the unauthorized use of operating system level commands is disclosed. The system includes a computer module including: a processor configured for performing data operations; a memory unit configured to store instructions executable by the processor; and an operating system module for supporting basic functions of the computer module, such as scheduling tasks, executing applications, and controlling peripherals. A virtual keyboard is connected to the computer module for creating one or more events or sequences of events recognizable by the operating system module. A system level command filter module is provided for filtering system level commands from the one or more recognizable events or sequences of events.

22 Claims, 9 Drawing Sheets

(56) References Cited

U.S. PATENT DOCUMENTS

| | | | |
|---|---|---|---|
| 7,861,936 B2 | 1/2011 | Kotlarsky et al. | |
| 8,020,215 B2* | 9/2011 | Nam | G06F 21/83 710/100 |
| 8,065,728 B2* | 11/2011 | Wang | G06F 21/554 713/164 |
| 8,181,247 B1* | 5/2012 | Pavlyushchik et al. | 726/22 |
| 8,195,822 B2* | 6/2012 | McMahan et al. | 709/230 |
| 8,313,032 B2 | 11/2012 | Fjellstad et al. | |
| 8,366,005 B2 | 2/2013 | Kotlarsky et al. | |
| 8,510,829 B2* | 8/2013 | Mohandas | G06F 21/56 709/238 |
| 8,677,487 B2* | 3/2014 | Balupari | G06F 21/552 726/22 |
| 8,800,053 B2* | 8/2014 | Ishida et al. | 726/26 |
| 8,928,589 B2* | 1/2015 | Bi | G06F 3/0425 345/168 |
| 2002/0178375 A1* | 11/2002 | Whittaker | G06F 21/52 726/22 |
| 2006/0213997 A1* | 9/2006 | Frank | G06F 3/0317 235/462.15 |
| 2007/0033588 A1* | 2/2007 | Landsman | 717/178 |
| 2007/0300167 A1* | 12/2007 | Kadur | G06F 8/38 715/762 |
| 2008/0149722 A1* | 6/2008 | Cheung | G06K 7/14 235/462.07 |
| 2008/0250063 A1* | 10/2008 | Hepworth | G06F 9/5055 |
| 2008/0294715 A1* | 11/2008 | Kanevsky | G06F 21/6263 |
| 2009/0328176 A1* | 12/2009 | Martin | G06F 19/322 726/7 |
| 2010/0177035 A1* | 7/2010 | Schowengerdt | G06F 1/163 345/156 |
| 2012/0054048 A1* | 3/2012 | Richardson | G06K 7/10861 705/20 |
| 2012/0079282 A1* | 3/2012 | Lowenstein | G06F 21/82 713/189 |
| 2012/0174233 A1* | 7/2012 | Waterson | G06F 21/83 726/26 |
| 2013/0001291 A1* | 1/2013 | Ibrahimbegovic | H04L 63/0823 235/375 |
| 2013/0304676 A1* | 11/2013 | Gupta | G06N 5/043 706/12 |
| 2014/0115705 A1* | 4/2014 | Fujishima et al. | 726/23 |
| 2015/0067701 A1* | 3/2015 | VanBlon et al. | 719/312 |
| 2016/0098362 A1* | 4/2016 | Summers | G06F 13/102 710/73 |

OTHER PUBLICATIONS

Toying with Barcodes, Phenoelit, Dec. 2007, 57 pages.
Crazy Square Barcodes can point your phone to Malware, John Leyden, The Register, Oct. 2011, 4 pages.
Universal RF Usb Keyboard Emulation Device URFUKED, Monta Elkins, Jun. 2010, 36 pages.
ID Product Profile, Smart-Scan Technology, Sep. 2009, 2 pages.
There's more in a Barcode than you think, 2010, 2 pages.
Smart-Scan first sale, Feb. 25, 2009, 1 page.
ID Integration presentation, Smart-Scan Technology, 2008, 13 pages.

* cited by examiner

| Ctrl | Dec | Hex | Char | Code | Dec | Hex | Char | Dec | Hex | Char | Dec | Hex | Char | Dec | Hex | Char | Dec | Hex | Char | Dec | Hex | Char | Dec | Hex | Char |
|---|---|---|---|---|---|---|---|---|---|---|---|---|---|---|---|---|---|---|---|---|---|---|---|---|---|
| @ | 0 | 00 |  | NUL | 32 | 20 |  | 64 | 40 | @ | 96 | 60 | ` | 128 | 80 | Ç | 160 | A0 | á | 192 | C0 | └ | 224 | E0 | α |
| A | 1 | 01 | ☺ | SOH | 33 | 21 | ! | 65 | 41 | A | 97 | 61 | a | 129 | 81 | ü | 161 | A1 | í | 193 | C1 | ┴ | 225 | E1 | β |
| B | 2 | 02 | ○ | STX | 34 | 22 | " | 66 | 42 | B | 98 | 62 | b | 130 | 82 | é | 162 | A2 | ó | 194 | C2 | ┬ | 226 | E2 | Γ |
| C | 3 | 03 | ♡ | ETX | 35 | 23 | # | 67 | 43 | C | 99 | 63 | c | 131 | 83 | â | 163 | A3 | ú | 195 | C3 | ├ | 227 | E3 | π |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| — | 31 | 1F | ▽ | US | 63 | 3F | ? | 95 | 5F | _ | 127 | 7F | ⌂ | 159 | 9F | ƒ | 191 | BF | ┐ | 223 | DF | ■ | 255 | FF |  |

*FIG. 1*

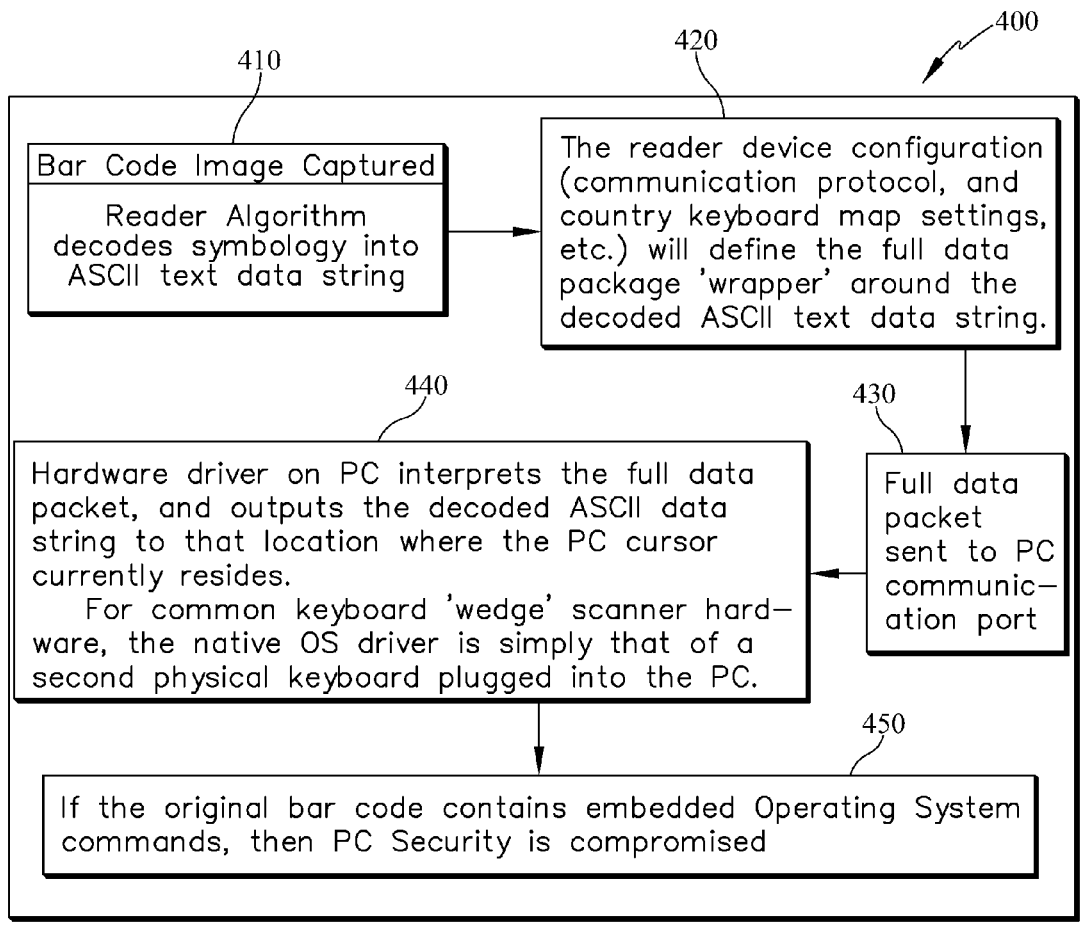

*FIG. 4*

| Windows | | |
|---|---|---|
| Press this key | To do this | Embedded character (1) |
| ⊞ | Open the Start menu and initiate file or command search | /w |
| ⊞+R | Display the System Run Command Line | /wr |
| ⊞+D | Display the System Desktop, allowing subsequent selection and permanent deletion of icons | /wd |
| ⊞+L | Lock your computer or switch users. | /wl |
| <CNTR>+<ESC> | Equivalent to ⊞ | /^/[ |

(1) Sample character string. Actual format can differ between scanner vendor models.

*FIG. 5*

OS SECURITY FILTER

RELATED APPLICATION

This application is a non-provisional of and claims the benefit of U.S. Provisional Application 61/794,931, of the same title, filed on Mar. 15, 2013, which is hereby incorporated by reference in its entirety.

TECHNICAL FIELD

This disclosure is related to security protection for operating systems.

BACKGROUND

A computer's operating system is a layer of software that may be security protected; connects to and runs other programs; manages a user connection to a program; manages display of information; assigns central memory use; manages disk units; performs input/output (I/O) functions; creates and copies files; creates file directory structures; lists available files; formats disks, establishes and enforces protection levels on files and folders; deletes unwanted files and directories, and performs other functions.

A user may interact with a computer operating system using an interface. One interface, known as the command-line interface, is a text based interface that allows a user to type in text commands to instruct the operating system to do any of the above or other tasks. Text based commands are simple commands but require more computer skills to use and hence are favored by more advanced computer users. Many computer users favor simpler interfaces of the kind provided by graphical user interfaces.

One simple graphical user interface popularized on Windows operating systems is the Start button. Many other operating systems have a similar user interface. When a user activates the Start button, a graphical user interface opens up to present a user with a menu of operating system level commands that a user may execute to do the above or other tasks. In order to activate the Start button and to execute system level instructions found on the Start menu, the user must enter one or more character events from a physical or virtual keyboard that are recognized by the operating system as a system level command. In addition, some operating systems like Windows have created hot keys which are specific characters or sequence of characters that when generated by the physical or virtual keyboard represents a system level command.

If the character event entered into a computer is not a system level command, the operating system will treat the character event as data and pass the data from the physical or virtual keyboard to a memory location associated with a task that the pointer of the operating system is executing. For example, if the task that the pointer is executing is an application, the data will pass to a memory location associated with the instruction that the operating system is executing. However, if the character event is a system level command, the operating system will treat the character event as a command to the operating system; thereby directing the pointer of the operating system to execute an operating system level task associated with the command. For example, if the system level command is a command to open a new application, the operating system will open a new application. If the system level command is to delete a file, the operating system will delete the file.

Graphical user interfaces and hotkeys in particular are valuable productivity tools that allow a user to quickly navigate through and execute specific operating system tasks. In the wrong hands, however, the graphical user interfaces and hotkeys create a vehicle for performing malicious, illegal, or productivity destructive acts on a computer.

Some computers are provided with security features for protecting against the unauthorized use of system level commands. For example, many computers are password protected to prohibit use of a computer except upon entry of the correct password into the computer. While these and other security features on computers are available, computer operators may benefit from devices, systems, and methods for enhancing the protection of the computer against malicious, illegal, or productivity destructive acts through unauthorized use of system level commands.

SUMMARY OF THE INVENTION

A system and method for protecting against the unauthorized use of operating system level commands is disclosed. One embodiment is a system that includes a computer module including a processor configured for performing data operations; a memory unit configured to store instructions executable by the processor; and an operating system module for supporting basic functions of the computer module, such as scheduling tasks, executing applications, and controlling peripherals. A virtual keyboard is connected to the computer module for creating one or more events or sequences of events recognizable by the operating system module. A system level command filter module is provided for filtering system level commands from the one or more recognizable events or sequences of events.

Another embodiment is a method for protecting against the unauthorized use of operating system level commands by a virtual keyboard. The method includes recognizing a system level code in one or more events or sequences of events in data generated by the virtual keyboard. The next step of the method includes either removing the recognized event or sequence of events from the generated data or replacing the recognized system level code in the generated data with a dummy event or sequence of events. In another embodiment, the step of replacing the recognized system level code involves replacing the recognized system level code with a data that is other than a system level command.

There are many other embodiments of the present disclosure, of which the following are a few examples.

BRIEF DESCRIPTION OF THE DRAWINGS

FIG. 1 shows a partial list of ASCII characters that may be generated by a virtual keyboard such as a scanner, a smart phone, etc.

FIG. 4 illustrates how a virtual keyboard and computer module operate without the system level command filter module of this disclosure.

FIG. 5 illustrates some PC keystroke combinations that can be used to redirect PC cursor position and introduce mayhem to an operating system.

DETAILED DESCRIPTION

A system and method for protecting against the unauthorized use of operating system level commands is disclosed. The system includes a computer module including: a processor configured for performing data operations; a memory unit configured to store instructions executable by the processor; and an operating system module for supporting basic functions of the computer module, such as scheduling tasks, executing applications, and controlling peripherals. A virtual keyboard is connected to the computer module for creating one or more events or sequences of events recognizable by the operating system module. A system level command filter module is provided for filtering system level commands from the one or more recognizable events or sequences of events.

FIG. 1 shows a partial list of ASCII characters that may be generated by a virtual keyboard such as a scanner, a smart phone, etc. The system level commends for each operating system and scanner module is different. In addition, the character maps of different countries, such as Japan, China, and the U.S. are different. To attack any single computer globally, the character map for the computer targeted for mayhem must first be determined. Then, the characters associated with the Windows® Start Key and other hot keys in a sequence configured to create mayhem can be deciphered and encoded into the bar code, which when scanned will infect the target computer with instructions to create mayhem.

Figure 2:
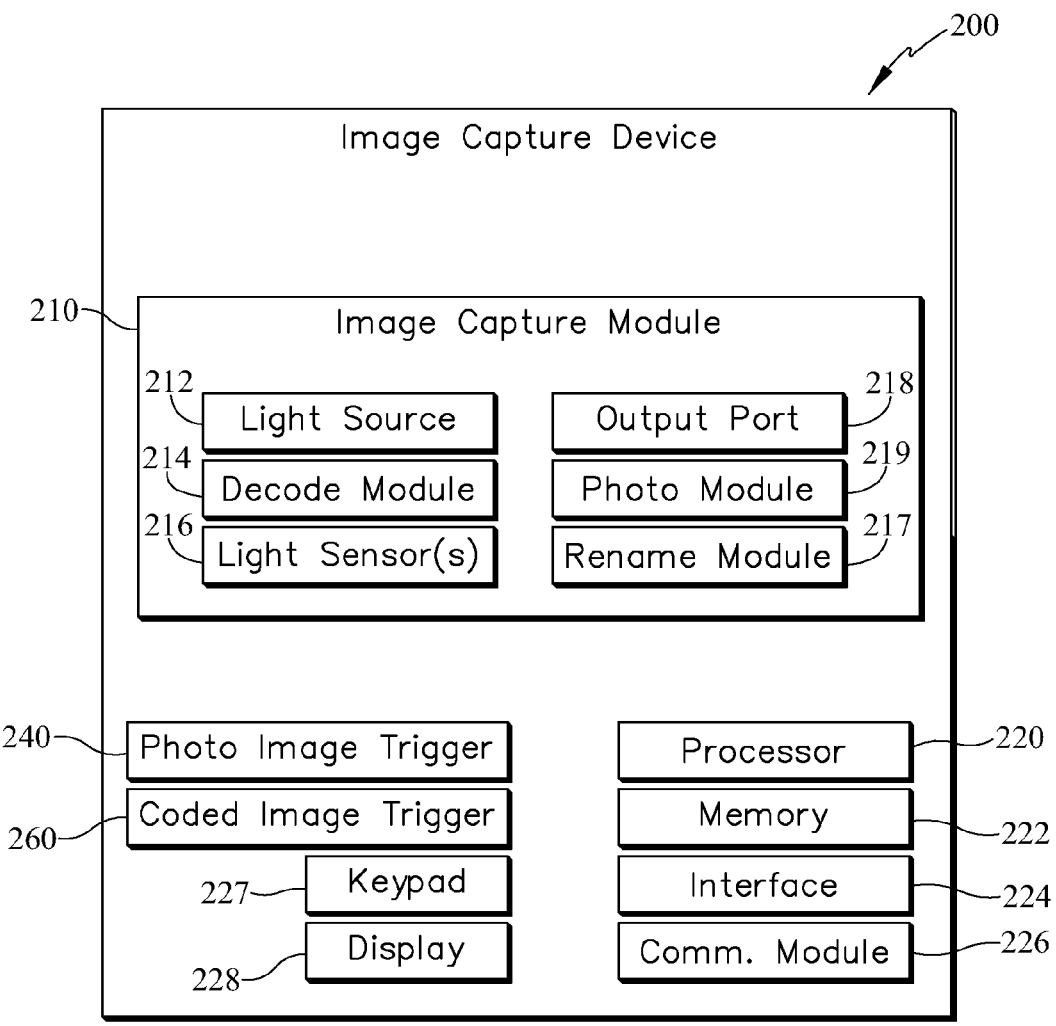
FIG. 2 shows an illustrative configuration of an image capture device 210 that may act as a virtual keyboard when connected to a PC

FIG. 2 shows an illustrative configuration of an image capture device 210 that may act as a virtual keyboard when connected to a PC through a predetermined connection such as through a USB connector. The image capture device may capture an image of a bar code symbol and generate a decoded ASCII character data string and/or capture a photo image(s). Other virtual keyboards may also be used with this disclosure.

Image capture device 210 illustratively comprises a processor 220, a memory unit 222, an interface 224, a communication module 226, a keypad 227, a display 228, a photo image trigger 240, and a bar code image trigger 260.

Processor 220 may be implemented in any number of ways. Such ways include, by way of example and not of limitation, digital and/or analog processors such as microprocessors and digital-signal processors (DSPs); controllers such as microcontrollers; software running in a machine; programmable circuits such as Field Programmable Gate Arrays (FPGAs), Field-Programmable Analog Arrays (FPAAs), Programmable Logic Devices (PLDs), Application Specific Integrated Circuits (ASICs), any combination of one or more of these, and so on.

Memory unit 222 may be implemented in any number of ways. Such ways include, by way of example and not of limitation, nonvolatile memories (NVM), read-only memories (ROM), random access memories (RAM), any combination of these, etc. Memory 222 may include programs containing instructions for execution by processor 220. The programs provide instructions for execution by the processor 220, and can also include instructions regarding protocols and decision making analytics, etc. that can be used by the image capture device 210. In addition, memory 222 can store rules, configurations, data, etc.

Interface 224 is hardware and software configured to provide electrical interfacing between the processor, the memory, the communication module, the keypad, the display, the photo image trigger, the bar code image trigger, and the image capture module can be made in any number of ways. For example, interface 224 may include a screen, to display a parameter of a patient that is detected and measured, provide visual feedback to the rescuer for their resuscitation attempts, and so on. Interface 224 may also include a speaker, to issue voice prompts, etc. Interface 224 may additionally include various controls, such as pushbuttons, keyboards, and so on.

Communication module 226 is hardware and software configured to transmit data to and from the image capture device. In an illustrative embodiment, the communication module 226 may include a wireless module and/or a hardwire connect module. The wireless module may illustratively be a Wi-Fi module. Additionally or alternatively, the wireless module may be a blue tooth module, a CDMA module, or any other communication module that enables a wireless communication link for the bidirectional flow of data between the image capture device and an external device. The hardwire connect module may be a hardware and software based data connector configured to connect with a data outlet of an external device such as a computer. The hardwire connect module may be one or more ports and associated circuitry and software that allow bidirectional flow of data between the image capture device and the device. Illustratively, the hardwire connect module may be an Ethernet connector, an RS232 connector, a USB or other wire connector. Other connectors and hardware and software configurable for providing a wireless and wired connection between the communication module 226 and the external device may be used for image capture device 210 as are well known in the art.

Keypad 227 can be made in any number of ways. For example, keypad 227 may include various controls, such as pushbuttons, keyboards, and so on for manual entry of data into the image capture device.

Display 228 may be a visual display capable of displaying data transmitted from processor 220. Displays for use with this disclosure may include an LCD screen, an e-paper display, or other bi-stable display, a CRT display or any other type of visual display.

Photo image trigger 240 may illustratively be a lever or button pushed by the finger or by some other external mechanism to activate a function for capturing a photo image. However, photo image trigger is not limited to a finger or other external activation. More broadly speaking, photo image trigger may also be located internally to the image capture device such as a circuit that initiates the action of capturing a photo image. Hence, triggers may be external triggers or internal triggers depending on the design.

Bar code image trigger 260 may illustratively be a lever or button pushed by the finger or by some other external mechanism to activate a function for capturing a bar code image. However, the bar code image trigger is not limited to a finger or other external activation. More broadly speaking, the bar code image trigger may also be located internally to the image capture device such as a circuit that initiates the action of capturing a bar code or OCR image. Hence, triggers may be external triggers or internal triggers depending on the design.

Image capture module 210 typically includes a light source 212, one or more light sensors 216, a decode module 214, a photo module 219, a photo file renaming module 217, and an output port 218. The light source 212 emits light to be reflected off an object. The light sensors 216 capture and translate the reflected light into electrical signals. If the bar code image trigger 260 is activated indicating the image captured is a bar code, the decode module 214 transforms the bar code image data represented by the electrical signals into a decoded ASCII character data string and provides the decoded data to the output port 218. If the photo image trigger 240 is activated indicating the image captured is a photo image, the photo module 219 transforms the photo image data represented by the electrical signals into image(s) file(s) and stores the image files with an auto root name on the system device memory through the output port 218. The output port may be connected to the processor 220 of the image capture device 200 by wire and the communication link provided by the wire link provides a data channel between the output port and the processor for downloading captured and transformed captured bar code data or captured photo image to the processor.

Figure 3:
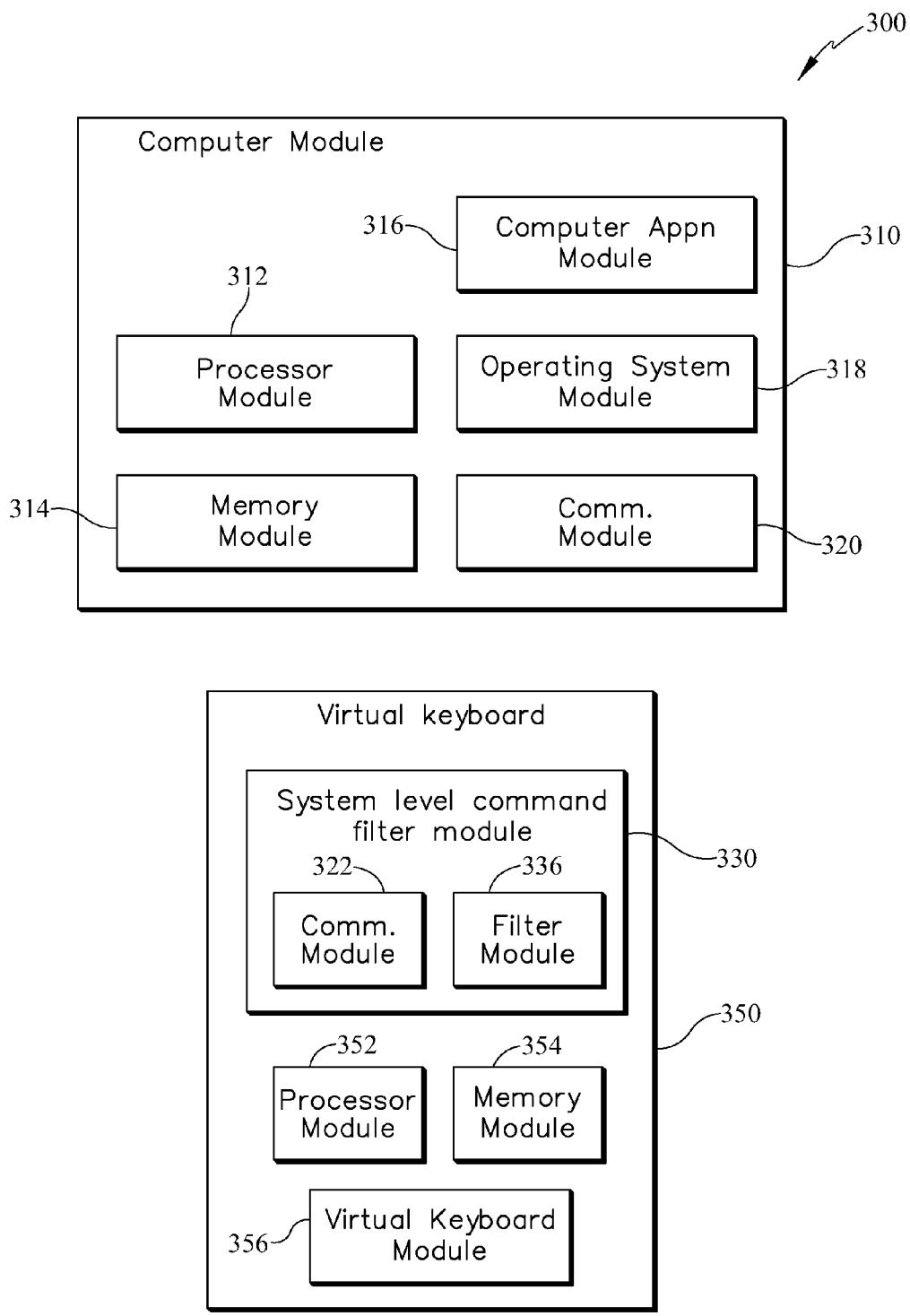
FIG. 3 shows an illustrative system for protecting against the unauthorized use of operating system level commands according to this disclosure.

FIG. 3 shows an illustrative system for protecting against the unauthorized use of operating system level commands according to this disclosure comprising a computer module 310, a virtual keyboard 350, and a system level command filter module 330.

The computer module 310 comprises a processor module 312, a memory module 314, a computer applications module 316, an operating system module 318, and a communication module 320.

The data processor 312 of the computer module 310 is a general purpose central processing unit (CPU) of a personal computer (PC) illustratively configured for performing data operations. Examples of CPU's include Pentium, Athlon, or other CPU. The data processor accesses instructions defined by the operating system that are stored in the memory module 314, performs actions based on those instructions using data stored in the memory 314 or some other source, stores data in memory 314, transmits data from the computer module 310 to the one or more external devices, etc. The data processor may be configured to control the modules within the computer module.

The memory module 314 of computer module 310 can be any form of data storage device. It may be at least one of random access memory (RAM) and/or read only memory (ROM). Information can be stored permanently until overwritten and/or stored temporarily for use while the unit is active.

The computer application module includes one or more applications to perform various data and other operations on the computer module.

The operating system module includes a PC operating system such as Apple's MacOS 8® or Microsoft's Windows NT. The operating system module supports basic functions of the computer module, such as scheduling tasks, executing applications, and controlling peripherals. These tasks include providing security to the software operation and use; connecting to and running other programs; managing a user connection to a program; managing display of information; assigning central memory use; managing disk units; performing input/output (I/O) functions; creating and copying files; creating file directory structures; listing available files; formatting disks, establishing and enforcing protection levels on files and folders; deleting unwanted files and directories, and performing other functions.

The communication module 320 is hardware and software configured to transmit data to and from the computer module. Illustratively, the communication module is configured to transmit and receive data from the computer module to and from an external utility. The external utility may be a computer, a laptop, a server, a mobile computing device, or other computing device. In an illustrative embodiment, the communication module may include a wireless module and/or a network data connect module. The wireless module may illustratively be a Wi-Fi module. Alternatively, the wireless module may be a blue tooth module, a CDMA module, or any other communication module that enables a wireless communication link for the bidirectional flow of data between devices wirelessly. The network data connect module may be a hardware and software based data connector configured to connect with a data outlet of the external utility. The network data connect module may be one or more ports and associated circuitry and software that allow bidirectional flow of data between the computer module and the external utility. Illustratively, the network data connect module is an Ethernet connector configured for connection to the external utility in a wired connection. Alternatively, the network data connect module may be an RS232 connector, a USB or other wire connector. Other connectors and hardware and software configurable for providing a wired connection between the communication module and the external utility may be used for network data connect module as are well known in the art. In an illustrative embodiment, the communication module is a USB connector.

The virtual keyboard 350 includes a processor module 352, a memory module, 354, and a virtual keyboard 356. The virtual keyboard is a computer keyboard that a user operates by typing on or within a wireless- or optical-detectable surface or area rather than by depressing physical keys. Such a system can enable the user of a small handheld device, such as a cellular telephone or a PDA (personal digital assistant) to have full keyboard capability. Illustratively, the virtual keyboard may be in the form factor of a scanner, an RFID reader, a smart phone, a mobile terminal, or any other device that when connected to the computer module functions as a virtual keyboard to the computer module. In one illustrative embodiment, the virtual keyboard is the image capture device 200 shown in FIG. 2. The virtual keyboard may be connected to the computer module for creating one or more events or sequences of events recognizable by the operating system module.

The processor module 352 may be like the processor 220 previously described in FIG. 2. The memory module 354 may be like the memory 222 previously described in FIG. 2. The virtual keyboard module 356 may be like the image capture module 210 described in FIG. 2. The descriptions of like modules in FIG. 2 are applicable to these like modules of the virtual keyboard 350.

In the illustrative embodiment shown in FIG. 3, the communication module is illustrative hardware and software constructs that enable the bidirectional communication between the filter module 336 of the system level command filter module and the virtual keyboard module 356 and illustratively other modules of the virtual keyboard.

The system level command filter module includes a communication module 322 and a filter module 336.

The communication module 320 may be like the communication module 226 previously described but is illustratively a USB connector in FIG. 3. The USB connector is short for Universal Serial Bus which is a specification to establish communication between devices and a host computer. The USB connector allows an external device to emulate a keyboard, in which case the external device is deemed to be a virtual keyboard as that term is used in this disclosure.

The system level command filter module may be software and hardware constructs for filtering system level commands from the one or more recognizable events or sequences of events as described in detail below.

Figure 6:
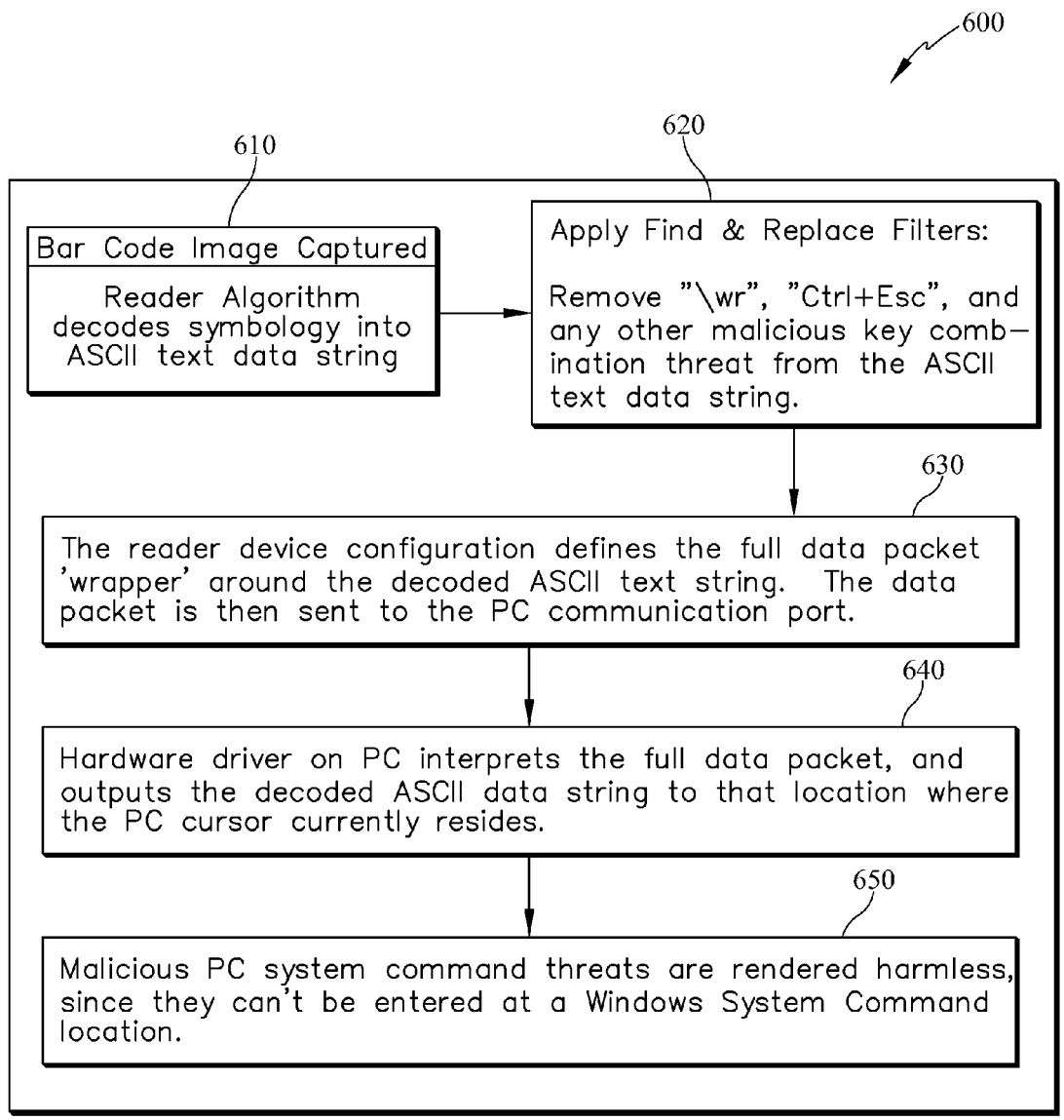
FIG. 6 illustrates how a virtual keyboard and computer module operate with the system level command filter module of this disclosure.

FIG. 4 illustrates how the virtual keyboard 350 and the computer module 310 shown in FIG. 3 operate without the system level command filter module 330 of this disclosure. FIG. 6 shows how the system level command filter module 330 of this disclosure protecting against the unauthorized use of operating system level commands by the virtual keyboard 330 with the computer module 310 which may cause a malicious, illegal, or productivity destructive act on the computer module, causing loss of altered data, heightened security, potential shut-down of operations, an investigation, accountability, and potential exposure to infiltration and other risks.

The virtual keyboard in FIG. 4 is illustratively a scanner. At step 410, a bar code image is captured and the reader algorithm decodes symbology into ASCII text string data. At step 420, the reader device configuration (e.g., communication protocol, country keyboard map settings, etc.) define the full data packet "wrapper" around the decoded ASCII text data string. At step 430, the full data packet is sent to the PC communication port which is communication module 320 of the computer module 310 in FIG. 3.

At step 440, the hardware driver on the PC interprets the full data packet, and outputs the decoded ASCII data string to that location where the PC cursor currently resides. For common keyboard "wedge" scanner hardware, the native operating system driver may simply be that of a $2^{nd}$ physical keyboard plugged into the PC. At step 450, if the original bar code contains embedded operating system commands, then the PC security may be compromised—especially if the system command is prefaced with proper characters to move the active PC cursor position to the OS Run command line.

FIG. 5 shows some of the more important system level commands that may compromise PC security since they open up the perimeter of a computer to an intruder. These system level commands may be followed with other Windows OS system commands to induce a large number of specific malicious PC threats. However, by using the system level command filter of this disclosure, this large number of threats can be nullified by filtering out the much smaller number of system level commands that can be used to compromise the perimeter of a computer.

For example, consider when the command in the ASCII text sequence of a decoded bar code image is a keyboard equivalent to the Windows key combination of (⊞+R). Windows OS anticipates that that which follows it is a system command and points the pointer of the Windows OS to the Windows Run command field. Hence, the sequence of \wr will cause the Windows OS to point its pointer to the Windows Run Command Line.

Hence, FIG. 5 shows more important system level commands that may open up the perimeter of a computer to an intruder. There are others. For example, the Windows OS recognizes the following as a functional equivalent to the Start key (⊞)

(CNTL+ESC)

The system filter command module of this disclosure functions to allow as many separate PC perimeter security threats as can be identified.

FIG. 6 shows how the system level command filter module 330 of this disclosure protects against the unauthorized use of operating system level commands by the virtual keyboard 330 with the computer module 310 which may cause a malicious, illegal, or productivity destructive act on the computer module, causing loss of altered data, heightened security, potential shut-down of operations, an investigation, accountability, and potential exposure to infiltration and other risks.

At step 610, a bar code image is captured and the reader algorithm decodes symbology into ASCII text string data. At step 620, the filter module 336 of the system level command filter module 330 of the virtual keyboard of FIG. 3, is a scanner in this example. At step 620, the filter module of the system level command filter module of this disclosure advantageously recognize a system level command code in the ASCII text string data generated by the scanner. On detection of a system level command code, the filter module advantageously removes the system level command code from the ASCII text string. As shown in FIG. 6, this system level command code may include a representation of the Windows Run command, or any other key combination that may pose a threat to the computer module as described by this disclosure. In addition or alternatively, the filter module may replace the system level command code with a dummy code. The dummy code may be any non-system level command code that does not cause system level instructions in the operating system of the computer module. In addition or alternatively, the filter module may fully block the entire ASCII text string. At step 630, the scanner configuration (e.g., communication protocol, country keyboard map settings, etc.) defines the full data packet "wrapper" around the decoded ASCII text data string and the full data packet is sent to the PC communication port which is communication module 320 of the computer module 310 in FIG. 3.

At step 640, the hardware driver on the PC interprets the full data packet, and outputs the decoded ASCII data string to that location where the PC cursor currently resides. At step 650, the malicious PC system command threats are rendered harmless since they cannot be entered at a Windows System command location.

While the illustrative embodiments shown in FIGS. 4, 5, 6 involve a Windows operating system, it will be appreciated that system level command codes of any other operating system may advantageously also be filtered to be rendered harmless by the filter module of this disclosure. A non-limiting example of another operating system is Apple's MacOS 8.

Figure 7:
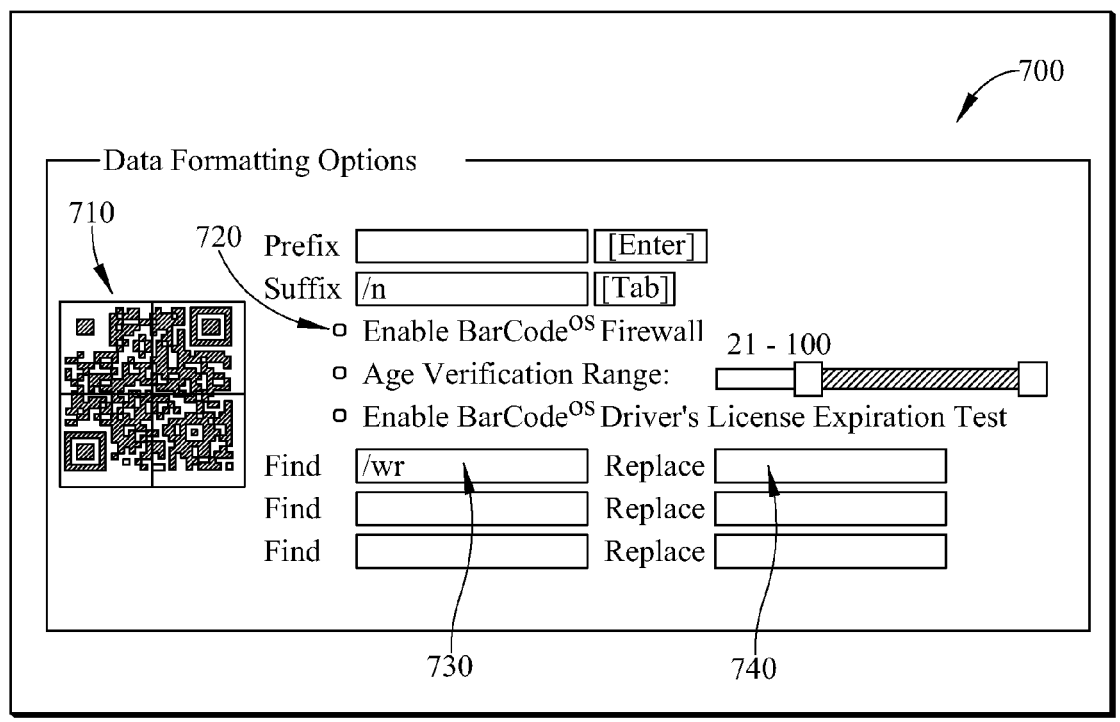
FIG. 7 illustrates an illustrative editor for configuring a scanner or other virtual keyboard with the filter module of this disclosure.

FIG. 7 illustrates an illustrative editor 700 for configuring a scanner or other virtual keyboard with the filter module of this disclosure. A scanner configuration bar code 710 is dynamically created by user interaction with the editor data form 700. The full featured filter module is enabled by activating the enable key 720. This one toggled setting by the user will enable a group of separate filters to defend against the perimeter threats identified in FIG. 5. Additionally or alternatively, a user may want to disable only specific system level command codes. In FIG. 7, the user has disabled the full-featured filter module by unchecking the enable key 720, and entered, in field 730, a single filter for the ASCII characters, \wr, which for the scanner model being used, emulate the Windows keyboard combination (⊞+r). As shown in the FIG. 7, the user may enter a number of different system level command codes into the filter module of this disclosure in order to render a plurality of system level command codes harmless. The user enters an ASCII text into the replace window 740 as the dummy code to replace the system level command code in the decoded ASCII data. In FIG. 7, the user has left this replace field 740 empty, resulting in a character deletion rather than a dummy code replacement. On executing the edited filter configuration by scanning the generated configuration bar code 710, the scanner is configured with the selected filter and replace settings so as to filter out the selected system level command code from any ASCII character string generated by the scanner.

Figure 8:
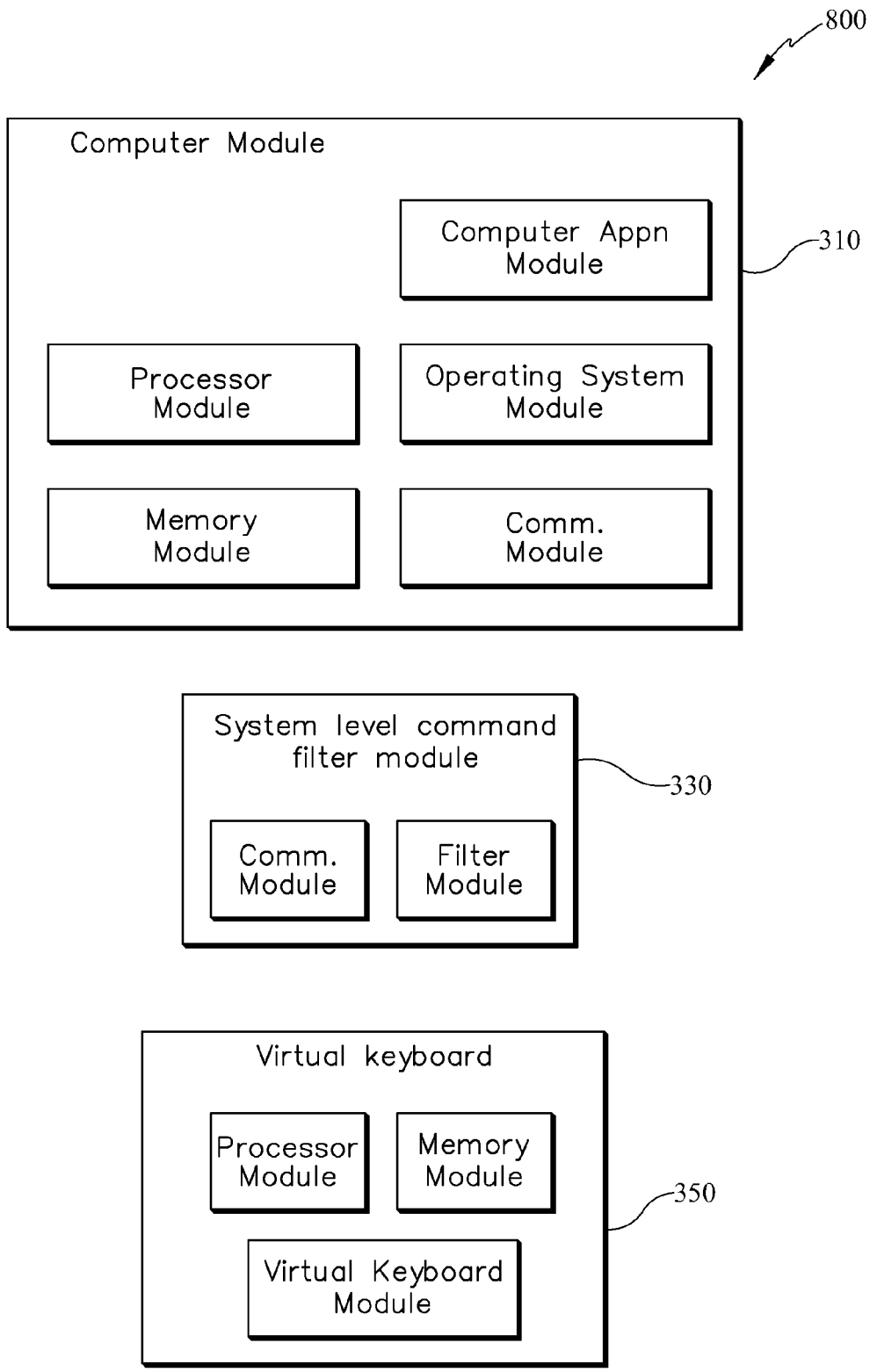
FIGS. 8 and 9 show alternative embodiments of the illustrative system for protecting against the unauthorized use of operating system level commands according to this disclosure.
Figure 9:
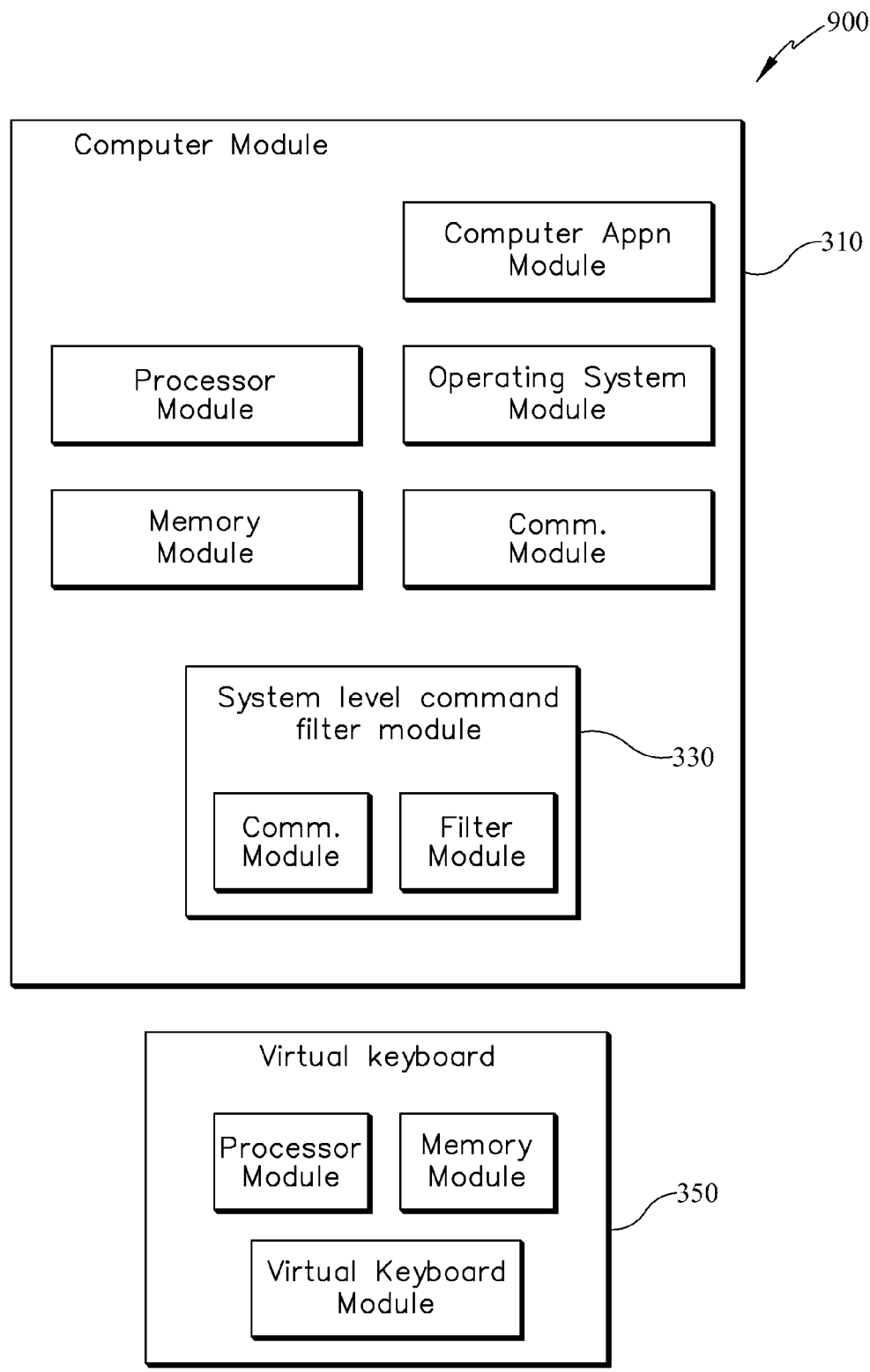

FIGS. 8 and 9 show alternative embodiments of an illustrative system 800, 900 for protecting against the unauthorized use of operating system level commands according to this disclosure each comprising a computer module 310, a virtual keyboard 350, and a system level command filter module 330. Each of these components have modules like the modules described in connection with FIG. 3 and the description of those modules in FIG. 3 describes how these like modules operate in the embodiments shown in FIGS. 8 and 9.

FIG. 8 shows the system level command filter 330 to reside in a form factor separate from the form factor of the virtual keyboard and the form factor of the computer module. Illustratively, the form factor is that of a dongle. In FIG. 9, the system level command filter module is shown to reside in the computer module. The interoperability of the system level command filter module with virtual keyboard and computer module in FIGS. 8 and 9 are like the interoperability of these modules in FIG. 3 with variances existing largely in the manner in which these modules interface to each other in the different FIGS. For example, in FIG. 8, the dongle requires some application specific hardware and software to operate. In FIG. 9, the system level command filter module may be integrated with the hardware and software of the computer module.

Tables 1-10, shown below, depict various system level command codes in a Windows operating system that may be embedded, in various sequences within a bar code symbology, to cause mayhem to a PC and that may be filtered according to the teachings of this disclosure. It will be appreciated that any system level command code generated by a virtual keyboard in any operating system in any computer may be rendered harmless by the system level command filter module of this disclosure.

Table 1 lists Windows OS Shortcuts that use the Windows Start Key (the Windows Logo Key).

TABLE 1

Windows OS 'Shortcuts' - Windows Start Key (Windows Logo Key, ):

| Press this key | To do this |
| --- | --- |
| ⊞ | Open or close the Start menu. |
| ⊞ + Pause | Display the System Properties dialog box. |
| ⊞ + D | Display the desktop. |
| ⊞ + M | Minimize all windows. |
| ⊞ + Shift+M | Restore minimized windows to the desktop. |
| ⊞ + E | Open Computer. |
| ⊞ + F | Search for a file or folder. |
| Ctrl + ⊞ + F | Search for computers (if you're on a network). |
| ⊞ + L | Lock your computer or switch users. |
| ⊞ + R | Open the Run dialog box. |
| ⊞ + T | Cycle through programs on the taskbar. |
| Shift + ⊞ + number | Start a new instance of the program pinned to the taskbar in the position indicated by the number. |
| ⊞ + Tab | Cycle through programs on the taskbar by using Aero Flip 3-D. |
| ⊞ + Spacebar | Preview the desktop. |
| ⊞ + ↑ | Maximize the window. |
| ⊞ + ← | Maximize the window to the left side of the screen. |
| ⊞ + → | Maximize the window to the right side of the screen. |
| ⊞ + ↓ | Minimize the window. |
| ⊞ + Home | Minimize all but the active window. |
| ⊞ + Shift + ↑ | Stretch the window to the top and bottom of the screen. |
| ⊞ + Shift + ← or → | Move a window from one monitor to another. |
| ⊞ + P | Choose a presentation display mode. |
| ⊞ + G | Cycle through gadgets. |
| ⊞ + U | Open Ease of Access Center. |
| ⊞ + X | Open Windows Mobility Center. |

Table 2 lists Windows OS Shortcuts using Windows Escape Key Sequences:

TABLE 2

Windows OS 'Shortcuts' - Windows Escape Key Sequences:

| Press this key | To do this |
| --- | --- |
| Ctrl-A | Select all; in Windows Explorer, selects all files in the current folder. In word processors, selects all text in the current document. |

TABLE 2-continued

Windows OS 'Shortcuts' - Windows Escape Key Sequences:

| Press this key | To do this |
|---|---|
| Ctrl-Alt-x | User-defined accelerator for a shortcut, in which x is any key. |
| Ctrl-Alt-Delete | Show the logon dialog when no user is currently logged on; otherwise, switch to the Windows Security dialog, which provides access to Task Manager and Log Off, as well as switching to another user, allowing you to change your password or lock the computer. Use Ctrl-Alt-Delete to access the Task Manager when Explorer crashes or your computer becomes unresponsive. |
| Ctrl-arrow key | Scroll without moving selection. |
| Ctrl-click | Use to select multiple, noncontiguous items in a list or in Windows Explorer. |
| Ctrl-drag | Copy a file. |
| Ctrl-End | Move to the end of a document (in many applications). |
| Ctrl-Esc | Open the Start menu; press Esc and then Tab to move focus to the Taskbar, or press Tab again to move focus to the Taskbar, and then cycle through the toolbars on the Taskbar every time you press Tab. |
| Ctrl-F4 | Close a document window in an MDI application. |
| Ctrl-F6 | Switch between multiple documents in an MDI application. Similar to Ctrl-Tab; hold Shift to go in reverse. |
| Ctrl-Home | Move to the beginning of a document (in many applications). |
| Ctrl-Space Bar | Select or deselect multiple, noncontiguous items in a listbox or in Windows Explorer. |
| Ctrl-Tab | Switch among tabs in a tabbed dialog or Internet Explorer; hold Shift for reverse. |
| Ctrl-C | Copy the selected item or selected text to the Clipboard. Also interrupts some command prompt applications. |
| Ctrl-F | Open Search (in Windows Explorer or on the Desktop only). |
| Ctrl-V | Paste the contents of the Clipboard. |
| Ctrl-X | Cut the selected item or selected text to the Clipboard. |
| Ctrl-Z | Undo; erases text just entered, or repeals the last file operation in WinExplorer. |

Table 3 depicts Windows OS Shortcuts using Windows Alt Key Sequences:

TABLE 3

Windows OS 'Shortcuts' - Windows Alt Key Sequences:

| Press this key | To do this |
|---|---|
| Alt | Send focus to the menu (same as F10). Also turns on the menu in applications where it is no longer used by default, such as Windows Explorer and Internet Explorer. |
| Alt-x | Activate menu or dialog control, where letter x is underlined (if the underlines are not visible, pressing Alt will display them). |
| Alt-double-click (on icon) | Display Properties sheet. |
| Alt-Enter | Display Properties sheet for selected icon in Windows Explorer or on the Desktop. Also switches command prompt between windowed and full-screen display. |
| Alt-Esc | Drop active window to bottom of pile, which, in effect, activates next open window. |
| Alt-F4 | Close current window; if Taskbar or Desktop has the focus, exit Windows. |
| Alt-hyphen | Open the current document's system menu in a multiple document interface (MDI) application. |
| Alt-numbers | When used with the numbers on the numeric keypad only, inserts special characters corresponding to their ASCII codes into many applications. For example, press the Alt key and type 0169 for the copyright symbol. Check characters map for full list of codes. |
| Alt-PrintScreen | Copy active window as a bitmap to the Clipboard. |

TABLE 3-continued

Windows OS 'Shortcuts' - Windows Alt Key Sequences:

| Press this key | To do this |
|---|---|
| Alt-Shift-Tab | Same as Alt-Tab, but in the opposite direction. |
| Alt-Space Bar | Open the current window's system menu. |
| Alt-Tab | Switch to the next running application hold Alt while pressing Tab to cycle through running applications. |
| Alt-M | When the Taskbar has the focus, minimize all windows and move focus to the Desktop. |
| Alt-S | When the Taskbar has the focus, open the Start menu. |

Table 4 displays Windows OS shortcuts using Windows Shift Key Sequences:

TABLE 4

Windows OS 'Shortcuts' - Windows Shift Key Sequences

| Press this key | To do this |
|---|---|
| Shift | While inserting a CD, hold to disable AutoPlay. |
| Shift-arrow keys | Select text or select multiple items in a listbox or in Windows Explorer. |
| Shift-click | Select all items between currently selected item and item on which you're clicking; also works when selecting text. |
| Shift-click Close button | Close current folder and all parent folders (Windows Explorer in single-folder view only). |
| Shift-Alt-Tab | Same as Alt-Tab, but in reverse. |
| Shift-Ctrl-Tab | Same as Ctrl-Tab, but in reverse. |
| Shift-Ctrl-Esc | Open the Task Manager. |
| Shift-Delete | Delete a file without putting it in the Recycle Bin. |
| Shift-double-click | Open folder in two-pane Explorer view. |
| Shift-Tab | Same as Tab, but in reverse. |

Table 5 depicts Windows Run Commands, typically made using the Windows logo key and +R:

TABLE 5

Windows Run Commands (⊞ + R)

| Administrative Tools | Control Panel |
|---|---|
| Administrative Tools = control admintools | Control Panel = control |
| Authorization Manager = azman.msc | Autoplay = control.exe /name Microsoft.autoplay |
| Component Services = dcomcnfg | Credential Manager = control.exe /name Microsoft.CredentialManager |
| Certificate Manager = certmgr.msc | Credential Manager Stored User Names and Passwords = credwiz |
| Display Languages = lpksetup | |
| ODBC Data Source Administrator = odbcad32 | Date and Time Properties = timedate.cpl |
| File Signature Verification Tool = sigverif | Default Programs = control.exe /name Microsoft.DefaultPrograms |
| Group Policy Editor = gpedit.msc | Set Program Access and Computer Defaults = control appwiz.cpl,,3 or ComputerDefaults |
| Add Hardware Wizard = hdwwiz.cpl | Display = dpiscaling |
| Iexpress Wizard = iexpress | Folders Options = control folders |
| Local Security Settings = secpol.msc | HomeGroup = control.exe /name Microsoft.HomeGroup |
| Microsoft Support Diagnostic Tool = msdt | Internet Properties = inetcpl.cpl |
| | Keyboard = control keyboard |
| Microsoft Management Console = mmc | Mouse = control mouse or main.cpl |
| Print management = printmanagement.msc | Network and Sharing Center = control.exe /name Microsoft.NetworkandSharingCenter |
| Problems Steps Recorder = psr | Network Connections = control netconnections or ncpa.cpl |
| People Near Me = p2phost | Programs and Features = appwiz.cpl or control appwiz.cpl |
| Registry Editor = regedit or regedt32 | Regional and Language = intl.cpl |
| System Configuration Utility = msconfig | RemoteApp = control.exe /name |

TABLE 5-continued

Windows Run Commands (⊞ + R)

| | |
|---|---|
| Resultant Set of Policy = rsop.msc | Microsoft.RemoteAppandDesktopConnections |
| SQL Server Client Configuration = cliconfg | System Properties = sysdm.cpl or Windows logo key + Pause/Break |
| Task Manager = taskmgr | SP ComputerName Tab = SystemPropertiesComputerName |
| Trusted Platform Module = tpm.msc | |
| TPM Security Hardware = TpmInit | SP Remote Tab = SystemPropertiesRemote |
| Windows Remote Assistance = msra | Taskbar and Start Menu = control.exe /name Microsoft.TaskbarandStartMenu |
| Windows Share Folder Creation Wizard = shrpubw | User Accounts = control.exe /name Microsoft.UserAccounts |
| Windows Standalong Update Manager = wusa | User Account Control Settings = UserAccountControlSettings |
| Windows System Security Tool = syskey | |
| Windows Script Host Settings = wscript | Windows Firewall = firewall.cpl |
| Windows Version = winver | Windows Update App Manager = wuapp |
| Windows Firewall with Advanced Security = wf.msc | |
| Windows Malicious Removal Tool = mrt | |

| Computer Management | Accessories |
|---|---|
| Computer Management = compmgmt.msc | Command Prompt = cmd |
| Task Scheduler = control schedtasks | Remote Desktop Connection = mstsc |
| Event Viewer = eventvwr.msc | Windows Explorer = explorer or Windows logo key + E |
| Shared Folders/MMC = fsmgmt.msc | Ease of Access Center = utilman or Windows logo key + U |
| Local Users and Groups = lusrmgr.msc | Internet Explorer = iexplore |
| Device Manager = devmgmt.msc | System Information = msinfo32 |
| Disk Management = diskmgmt.msc | Windows PowerShell ISE = powershell_ise |
| Services = services.msc | Windows PowerShell = powershell |
| Windows Management Infrastructure = wmimgmt.msc | Open Documents folder = documents |
| | Open Pictures folder = pictures |
| | Open Music folder = music |
| Logs out of Windows = logoff | Open Videos folder = videos |
| Locks User Account = Windows logo Key + L | Open Downloads folder = downloads |
| | Open Favorites folder = favorites |
| | Open Recent folder = recent |

Table 6 depicts Windows System Commands for network and task queries:

TABLE 6

Windows System Commands for Network & Task Queries

Pathping does a good job of telling you whether two machines can communicate with one another over TCP/IP, but if a ping does fail, you won't receive any information regarding the nature of the failure. This is where the pathping utility comes in. Pathping is designed for environments in which one or more routers exist between hosts. It sends a series of packets to each router that's in the path to the destination host in an effort to determine whether the router is performing slowly or dropping packets. At its simplest, the syntax for pathping is identical to that of the ping command (although there are some optional switches you can use). The command looks like this:
pathping 192.168.1.1
Ipconfig is used to view or modify a computer's IP addresses. For example, if you wanted to view a Windows 7 system's full IP configuration, you could use the following command:
ipconfig /all
Assuming that the system has acquired its IP address from a DHCP server, you can use the ipconfig command to release and then renew the IP address. Doing so involves using the following commands:
    ipconfig /release    ipconfig /renew
Another handy thing you can do with ipconfig is flush the DNS resolver cache. This can be helpful when a system is resolving DNS addresses incorrectly. You can flush the DNS cache by using this command:
ipconfig /flushdns
Tasklist is designed to provide information about the tasks that are running on a Windows 7 system. At its most basic, you can enter the following command: tasklist
The tasklist command has numerous optional switches, but there are a couple I want to mention. One is the -m switch, which causes tasklist to display all the DLL modules associated with a task. The other is the -svc switch, which lists the services that support each task. Here's how they look:
    tasklist -m    tasklist -svc

TABLE 6-continued

Windows System Commands for Network & Task Queries

Taskkill terminates a task, either by name (which is referred to as the image name) or by process ID. The syntax for this command is simple. You must follow the taskkill command with -pid (process ID) or -im (image name) and the name or process ID of the task that you want to terminate. Here are two examples of how this command works:
    taskkill -pid 4104  taskkill -im iexplore.exe Table 7 depicts Windows OS shortcuts using Windows escape sequences:

TABLE 7

Windows OS 'Shortcuts' - Windows Escape Sequences

| Escape sequence | Description | Cntrl + | ASCII digit | ASCII Hex |
|---|---|---|---|---|
| \' | single quote | | | \x27 |
| \" | double quote | | | \x22 |
| \? | question mark | | | \x3f |
| \\ | Backslash | | | \x5c |
| \0 | <NUL>, null character | | | \x00 |
| \a | <BEL>, Alert | g | 7 | \x07 |
| \b | <BS>, Backspace | h | 8 | \x08 |
| \f | <FF>, form feed, new page | l | 12 | \x0c |
| \n | <LF>, line feed, new line | j | 10 | \x0a |
| \r | <CR>, carriage return | m | 13 | \x0d |
| \t | <HT>, horizontal tab | i | 9 | \x09 |
| \v | <VT>, vertical tab | k | 11 | \x0b |
| \nnn | arbitrary octal value | | | \nnn |
| \xnn | arbitrary hexadecimal value | | | \xnn |
| \unnnn | arbitrary Unicode value. May result in several characters. | | | \unnnn |
| \Unnnnnnnn | arbitrary Unicode value. May result in several characters. | | | \Unnnnnnnn |

Table 8 depicts Windows OS Shell commands:

TABLE 8

Windows OS 'Shell' Commands

| Shell Command | Path of Folder it Opens | Win OS Version 7 | 8 | 8.1 |
|---|---|---|---|---|
| shell:AppsFolder | Applications | | x | x |
| shell:ConnectionsFolder | Control Panel\All Control Panel Items\Network Connections | x | x | x |
| shell:Contacts | C:\Users\(user-name)\Contacts | x | x | x |
| shell:ControlPanelFolder | Control Panel\All Control Panel Items | x | x | x |
| shell:CredentialManager | C:\Users\(user-name)\AppData\Roaming\Microsoft\Credentials | x | x | x |
| shell:desktop | Your desktop folder | x | x | x |
| shell:documentsLibrary | Libraries\Documents | x | x | x |
| shell:downloads | C:\Users\(user-name)\Downloads | x | x | x |
| shell:Favorites | C:\Users\(user-name)\Favorites | x | x | x |
| shell:HomeGroupFolder | Homegroup | | x | x |
| shell:Libraries | Libraries | x | x | x |
| shell:MusicLibrary | Libraries\Music | x | x | x |
| shell:MyComputerFolder | Computer (Windows 8) or This PC (Windows 8.1) | x | x | x |
| shell:My Music | C:\Users\(user-name)\Music | x | x | x |
| shell:My Pictures | C:\Users\(user-name)\Pictures | x | x | x |
| shell:My Video | C:\Users\(user-name)\Videos | x | x | x |
| shell:NetworkPlacesFolder | Network | x | x | x |
| shell:Personal | C:\Users\(user-name)\Documents | x | x | x |
| shell:PicturesLibrary | Libraries\Pictures | x | x | x |
| shell:ProgramFiles | C:\Program Files | x | x | x |
| shell:RecycleBinFolder | Recycle Bin | x | x | x |
| shell:System | C:\Windows\System32 | x | x | x |
| shell:ThisPCDesktopFolder | Desktop | | | x |
| shell:UserProfiles | C:\Users | x | x | x |
| shell:UsersLibrariesFolder | Libraries | x | x | x |
| shell:Windows | C:\Windows | x | x | x |

Table 9 depicts Windows 7 OS run command line shortcuts:

TABLE 9

| Windows 7 OS Run Command Line Shortcuts | |
|---|---|
| Add Network Location (wizard) | rundll32.exe shwebsvc.dll,AddNetPlaceRunDll |
| Add/Remove Programs | RunDll32.exe shell32.dll,Control_RunDLL appwiz.cpl,,0 |
| Welcome Center | rundll32.exe oobefldr.dll,ShowWelcomeCenter |
| Content Advisor | RunDll32.exe msrating.dll,RatingSetupUI |
| Control Panel | RunDll32.exe shell32.dll,Control_RunDLL |
| Date and Time Properties | RunDll32.exe shell32.dll,Control_RunDLL timedate.cpl |
| Display Settings | RunDll32.exe shell32.dll,Control_RunDLL access.cpl,,3 |
| Device Manager | RunDll32.exe devmgr.dll DeviceManager_Execute |
| Folder Options - File Types | RunDll32.exe shell32.dll,Control_Options 2 |
| Folder Options - General | RunDll32.exe shell32.dll,Options_RunDLL 0 |
| Folder Options - Search | RunDll32.exe shell32.dll,Options_RunDLL 2 |
| Folder Options - View | RunDll32.exe shell32.dll,Options_RunDLL 7 |
| Hibernate | RunDll32.exe powrprof.dll,SetSuspendState |
| Keyboard Properties | RunDll32.exe shell32.dll,Control_RunDLL main.cpl @1 |
| Lock Screen | RunDll32.exe user.32.dll,LockWorkStation |
| Manage Wireless Networks | explorer.exe shell:::{1fa9085f-25a2-489b-85d4-86326eedcd87} |
| Map Network Drive | RunDll32.exe shell32.dll,SHHelpShortcuts_RunDLL Connect |
| Mouse Properties | RunDll32.exe shell32.dll,Control_RunDLL main.cpl @0 |
| Network Connections | RunDll32.exe shell32.dll,Control_RunDLL ncpa.cpl |
| Open Control Panel (All Items) | explorer.exe shell:::{21ec2020-3aea-1069-a2dd-08002b30309d} |
| Pen and Touch Tablet PC Settings | rundll32.exe shell32.dll,Control_RunDLL tabletpc.cpl |
| People Near Me | rundll32.exe shell32.dll,Control_RunDLL collab.cpl |
| Regional Settings | RunDll32.exe shell32.dll,Control_RunDLL intl.cpl,,3 |
| Screen Resolution | rundll32.exe shell32.dll,Control_RunDLL desk.cpl |
| Set Program Access and Computer Defaults | rundll32.exe shell32.dll,Control_RunDLL appwiz.cpl,,3 |
| System Properties | rundll32.exe shell32.dll,Control_RunDLL sysdm.cpl |
| Stored Usernames and Passwords | RunDll32.exe keymgr.dll,KRShowKeyMgr |
| System Properties: Advanced | RunDll32.exe shell32.dll,Control_RunDLL sysdm,cpl,,4 |
| System Properties: Automatic Updates | RunDll32.exe shell32.dll,Control_RunDLL sysdm.cpl,,5 |
| Taskbar Properties | RunDll32.exe shell32.dll,Options_RunDLL 1 |
| User Accounts | RunDll32.exe shell32.dll,Control_RunDLL nusrmgr.cpl |
| Windows Security Center | RunDll32.exe shell32.dll,Control_RunDLL wscui.cpl |
| Windows - About | RunDll32.exe SHELL32.DLL,ShellAboutW |
| Windows Firewall | RunDll32.exe shell32.dll,Control_RunDLL firewall.cpl |
| Wireless Network Setup | RunDll32.exe shell32.dll,Control_RunDLL NetSetup.cpl,@0,WNSW |

Table 10 depicts miscellaneous shortcuts used by Windows 7:

TABLE 10

| Windows 7 OS Miscellaneous 'Shortcuts' | |
|---|---|
| Internet Explorer Specific Commands | |
| Delete Temporary Internet Files: | RunDll32.exe InetCpl.cpl,ClearMyTracksByProcess 8 |
| Delete Cookies: | RunDll32.exe InetCpl.cpl,ClearMyTracksByProcess 2 |
| Delete History; | RunDll32.exe InetCpl.cpl,ClearMyTracksByProcess 1 |
| Delete Form Data; | RunDll32.exe InetCpl.cpl,ClearMyTracksByProcess 16 |
| Delete Passwords: | RunDll32.exe InetCpl.cpl,ClearMyTracksByProcess 32 |
| Delete All: | RunDll32.exe InetCpl.cpl,ClearMyTracksByProcess 255 |

TABLE 10-continued

Windows 7 OS Miscellaneous 'Shortcuts'

| | |
|---|---|
| Delete All + files and settings stored by Add-ons: | RunDll32.exe InetCpl.cpl,ClearMyTracksByProcess 4351 |

Miscellaneous Variables

| | |
|---|---|
| Windows Directory | %WINDIR% |
| | %SYSTEMROOT% |
| Hard Drive That Contains OS | %HOMEDRIVE% |
| Users Home Directory | %HOMEPATH% |
| | %USERPROFILE% |
| Default Temporary Directory | %TEMP% |
| | %TMP% |
| Program Files | %PROGRAMFILES% |
| Current Users Application Data Directory | %APPDATA% |

The following examples illustrate several possible threats to PC security through the scanning of bar code symbologies with embedded malicious system level commands. The intent throughout these threat examples is to demonstrate possible PC security breaches without use of the system level command filter module of this disclosure.

Example 1: Benign Malicious Website

One sequence of events is a simple web URL:
www.virus.com
The PC cursor is located within an MS Word or Excel document. The pointer of the Windows OS is pointing to a memory location associated with the MS Word or Excel document application. A virtual keyboard enters the above simple web URL sequence of events or characters into the PC. Since the sequence of events or characters representing the web URL www.virus.com is not associated with a system level command code, the Windows OS interprets the sequence of events as ordinary data characters. The pointer of the Windows OS remains pointed to the same the memory location in the MS Word or Excel document application to which the Windows OS pointer was originally pointing. The simple web URL sequence of events are stored into the memory location and displayed in the associated location in the MS Word document or cell of the Excel document.

Example 2: Malicious Intrusion Through PC Security Perimeter

The PC cursor is located within an MS Word or Excel document. The pointer of the Windows OS is pointing to a memory location associated with the MS Word or Excel document application. A virtual keyboard enters the sequence of events or characters corresponding to the Windows Start key (⊞). This is a system level command that redirects the pointer of a Windows7 OS away from its current application location, to a "Search/Run" field. This opens the "Search/Run" field in the Windows OS to receive further events or sequences of events from the virtual keyboard. If the sequence of characters that follow are friendly instructions then there may be no problem. But if the sequence of characters that follows contains malicious instructions, the Windows OS may be infected with mayhem. In this example, because the encoded string includes a system level command, the system level command filter module, if enabled, would either strip that command from the encoded data string or completely block the full message from reaching the Windows OS. The choice whether to fully block the string or simply filter out the system command characters is defined by user preference, illustratively shown in FIG. 7.

Example 3: Malicious Intrusion to System Run Command Line

Same example as in Example 2 except the virtual keyboard enters the sequence of events or characters corresponding to the combined pressing of the Windows Start key (⊞) plus the 'r' key. Although the actual embedded characters in the bar code may be dependent in part on the scanner model, we illustratively for this example will use the '/wr' character combination to indicate this equivalent combination key press. The Windows OS recognizes this command as an instruction to open up, and move the cursor pointer to, the Windows OS Run Command Line—where further events or sequences of events from the virtual keyboard will be entered. If the sequence of characters that follows are friendly instructions then there may be no problem. But if the sequence of characters that follow constitute one or more malicious instructions, the Windows OS may be infected with mayhem. By simply prefacing the malicious URL of Example 1 with the Windows Start key combination (⊞ +r) discussed in this example, the malicious URL is executed with the opening of a browser window and direction to the malicious URL location.

Example 4 Unintended Opening of Malicious Web URL

Same example as Example 2 except that the virtual keyboard is a scanner being used at a point-of-sale in a toy market. A mother with her daughter is buying a toy for her daughter. The scanner has scanned a bar code on a toy product containing the character string representing the Windows Start key (⊞) command followed by the character string representing a pornographic website www.porn.com. The scanner has decoded the scanned bar code into an ASCII text string. In response to the character string representing the Windows Start key (⊞) command, the Windows OS on the point-of-sale PC has pointed its pointer to the "Search/Run" field to receive further events or sequences of events from the scan. The next character string in the ASCII text string that the Windows OS receives is the ASCII text string representing the pornographic website www.porn.com. The pointer of the Windows OS directs the data in the ASCII text string representing the pornographic website www.porn.com into the "Search/Run" field of the Windows OS. The "Search/Run" field executes the pornographic website www.porn.com causing pornography to be displayed on the display screen of the PC in front of the mother and daughter. The scanner has performed a malicious, illegal, or productivity destructive act on the PC at the kiosk causing unthinkable customer discomfort, potential shut-down of the point-of-sale, an investigation, accountability, loss of business, and potential exposure to lawsuits and other risks.

Example 5: Unintended Opening of Malicious Web URL

Same example as Example 2 except that the scanner is being used to scan inventory at a military installation. The scanner has scanned a bar code containing the character string representing the Windows Start key (⊞) command followed by the character string representing a terrorist website www.terrorist.com. The scanner has decoded the scanned bar code into an ASCII text string. In response to the character string representing the Windows Start key (⊞) command, the Windows OS on the military PC has pointed its pointer to the "Search/Run" field to receive further events or sequences of events from the scan. The next character string in the ASCII text string that the Windows OS receives is the ASCII text string representing the terrorist website www.terrorist.com. The pointer of the Windows OS directs the data in the ASCII text string representing the terrorist website www.terrorist.com into the "Search/Run" field of the Windows OS. The "Search/Run" field executes the terrorist website www.terrorist.com causing terrorist website to be displayed on the display screen of the PC in the military installation. The scanner has performed a malicious, illegal, or productivity destructive act on the PC at the military installation causing heightened security, potential shut-down of the military installation, an investigation, accountability, and potential exposure to terrorist infiltration and other risks.

Example 6: Unintended Malicious Email Transmission

Same example as Example 3 except that the character string in the bar code following the /wr keyboard equivalent command is:

mailto.johnsmith@smithco.com?cc=maryjones@jonesco.com&bcc=
anybodyelse@anybody.com&subject=Please%20Change%20Names&
    body=Your%20names%20are%20very%20common%
    20and%20will%20be %20deleted!

In response to the embedded character string /wr, the scanner transmits the equivalent Windows Start key combination (⊞ +r) to the Windows OS PC, which redirects its pointer to the "Windows OS Run Command Line" field, into which further events or sequences of events from the scan are placed. In response to the embedded mailto ASCII text string, the pointer of the Windows OS directs the Windows OS to open the default email software application. This could be Windows Outlook®, or any other installed email management software application. For illustrative purposes of this example we will assume Windows Outlook is the program being used. The foregoing system command has opened up outlook email with the current PC user as the unintentional sender, and the following email contents:

To: John Smith
Cc: Mary Jones
  Bcc: AnyBodyElse
  Subject: Please Change Names
  Content: Your names are very common and will be deleted!

The scanner has performed a malicious, illegal, or productivity destructive act on the PC causing heightened security, potential shut-down of the facility, an investigation, accountability, and potential exposure to terrorist infiltration and other risks.

Example 7: Malicious Hard Drive Deletion

Same example as Example 3 except that the character string in the bar code following the Windows Start key Combination (⊞ +r) command is:
  Cmd /k cd \ del *.* /Q
Execution of the above will open an MS-DOS terminal window, change to the local root hard drive location, and delete all files without prompting for "Are you sure?".

Example 8: Malicious File Folder Deletion

A consumer goes to a Starbucks® café and buys a cup of coffee. The consumer provides the check-out server with his iPhone® on which is displayed a bar code entitling the consumer to a free cup of coffee. The check-out server scans the bar code which has been previously altered to contain the following keyboard equivalent characters:
  (⊞ +d)(CTRL+a)(SHFT+DEL)y
The key combinations enclosed in parenthesis indicate equivalent characters in the bar code which emulate these simultaneously depressed key combinations. The scanner has decoded the scanned bar code into an ASCII text string. In response to the ASCII character string representing the (⊞ +d) key combination, the Windows OS on the Starbucks® PC points its pointer to the Windows OS Desktop. The next sequence of characters that the Windows OS sees is the ASCII character string representing the (CTRL+a) key combination. In response, the Windows OS on the Starbucks® PC points its pointer to select the entire group of files on the Starbucks® PC Desktop screen. The next sequence of characters that the Windows OS sees is the ASCII character string representing the (SHFT+DEL) key combination. In response, the Windows OS on the Starbucks® PC initiates a 'permanent' file delete process, and points its pointer to the delete files alert screen on the Starbucks® PC. The file character 'y' in the transmitted ASCII command string gets interpreted by the Windows OS as an affirmation "Yes" of the permanent file delete process. The scanner has performed a malicious, illegal, or productivity destructive act on the Starbucks® PC, causing loss of data files, heightened security, potential shut-down of the Starbucks®, an investigation, accountability, and potential exposure to infiltration and other risks.

Example 9: Malicious Changes to OS Settings

The same example as in Example 3 except that the scanner is used at a business and the ASCII character string generated from the bar code represents system level commands for changing time, date, or other configurations settings on the business PC—see Tables 1-10 for command examples. In response, the Windows OS on business PC points its pointer to perform the setting reconfigurations dictated by the system level commands in the ASCII character string. The scanner has performed a malicious, illegal, or productivity destructive act on the business PC, causing loss of altered data, heightened security, potential shut-down of the business, an investigation, accountability, and potential exposure to infiltration and other risks.

While many of the illustrative embodiments show system level commands of a Windows operating system, it will be appreciated that this disclosure is applicable for use with system commands of any operating system in which the PC operating system commands may be manually typed from a user's keyboard. The virtual keyboards taught by this disclosure may issue those same PC operating system commands and the security filter of this disclosure protects against the unauthorized use of these and operating system level commands. Illustratively, there are hundreds of such commands within any and all PC Operating Systems (Windows, Mac, Linux, Blackberry, iPhone, Android, Chrome, etc). These commands, however, are not a PC security threat unless entered and interpreted as an OS System Command. The security filter of this disclosure renders these OS System Commands that may appear in a decoded ASCII text string harmless.

Example 10: Malicious Airline Boarding Pass

Figure 10:
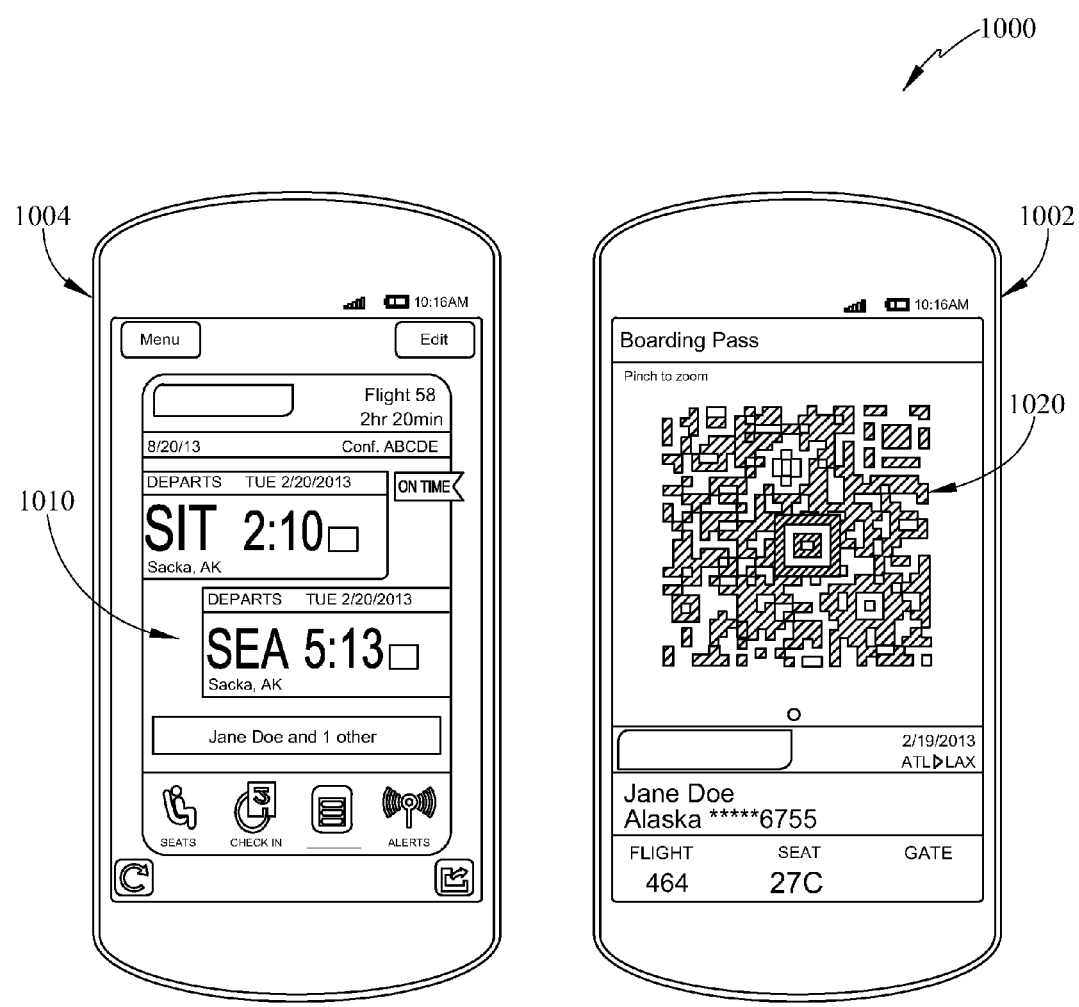
FIG. 10 shows a smart phone with bar code depicting a boarding pass number that may cause mayhem to an airlines counter according to this disclosure.

Similar example as in Example 8 except that a traveler goes to an Alaskan Airlines® check-in counter to check in for a flight. The traveler provides the agent with his browser enabled smartphone on which is displayed a bar code depicting a boarding pass number for his flight. More specifically, FIG. 10 shows a bar code 1020 that is displayed on the screen of his browser enabled smartphone 1002 that the traveler hands the agent at time of check-in as an electronic version of his boarding pass. Displayed on a display screen 1010 of the browser enabled smartphone 1004 also appearing in FIG. 10 is another screen shot that shows the flight information that is captured in the bar code 1020 that is displayed on the browser enabled smartphone 1002 handed the agent.

The agent scans the bar code which has been previously altered to contain the following characters:

(⌘+d)(CTRL+a)(SHFT+DEL)y

Just as in Example 8, in response to this string of characters, the Windows OS points its pointer to the Windows Start Button, then goes to the display files on the PC screen which displays the files on the Alaskan Airlines® PC screen, then selects files on the screen Alaskan Airlines® PC screen; and then deletes those files on the Alaskan Airlines® PC screen. Hence, the scanner used by the agent in this example has performed a malicious, illegal, or productivity destructive act on the Alaskan Airlines® PC. Since the PC may be a networked computer, this example shows how a rogue bar code may have caused damage to files throughout the network. The result is loss of data files, heightened security, potential shut-down of parts of Alaskan Airlines® ticketing, an investigation, accountability, and potential exposure to infiltration and other risks.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein. In addition, the invention may be practiced in combination with other systems. The following claims define certain combinations and sub-combinations of elements, features, steps, and/or functions, which are regarded as novel and non-obvious. Additional claims for other combinations and sub-combinations may be presented in this or a related document.

What is claimed is:

1. An image capture device external to a computer comprising:
   a light sensor to capture an image;
   a processor;
   a transmitter to couple the image capture device to a communication port of the computer in a manner that emulates the coupling of a keyboard to the communication port of the computer; and
   a memory module to store instructions that, when executed by the processor, cause the processor to:
      transform the image captured by the light sensor into a sequence of characters that emulates indications of keypresses of keyboard keys;
      recognize at least one character in the sequence of characters that is interpretable by an operating system of the computer as a system level command to point a cursor generated by the operating system to a command line of the operating system to enable entry of a further one or more characters of the sequence of characters at the command line;
      filter the further one or more characters from the sequence of characters in response to the further one or more characters comprising a malicious command to prevent provision of the malicious command to the computer in the sequence of characters; and
      operate the transmitter to transmit the sequence of characters in a wrapper defined by a communication protocol, following the filtration of the further one or more characters from the sequence of characters, from the image capture device and to the communication port of the computer, wherein:
         the operating system is to be executed within the computer to support basic functions of the computer; and
         the basic functions comprise interpretation of sequences of characters received by the computer via the communication port to identify commands to cause the computer to execute tasks.

2. The image capture device of claim 1, wherein the processor is caused to:
   recognize the at least one character in the sequence of characters as interpretable by the operating system of the computer as a system level command; and
   replace the at least one character in the sequence of characters with a dummy code.

3. The image capture device of claim 2, wherein the dummy code comprises one or more characters that emulate data entered via keypresses of keyboard keys, and is not interpretable by the operating system of the computer as a system level command.

4. The image capture device of claim 1, wherein the image capture device comprises:
   a dongle in which the transmitter resides to couple the dongle to the communication port of the computer; and
   a bar code scanner in which the light sensor resides, wherein the bar code scanner is configured to be coupled to the dongle.

5. The image capture device of claim 4, wherein:
   the dongle comprises the processor and the memory module; and the processor is caused to receive the sequence of characters from the bar code scanner.

6. The image capture device of claim 5, wherein the sequence of characters is transmitted wirelessly from the bar code scanner to the dongle.

7. The image capture device of claim 1, wherein the image capture device comprises a bar code scanner in which the light sensor, the processor, the memory module and the transmitter reside.

8. The image capture device of claim 7, wherein the transmitter is configured to be coupled to the communication port of the computer via a cable.

9. The image capture device of claim 8, wherein the communication port of the computer conforms to a specification selected from a group consisting of Universal Serial Bus (USB) and RS-232.

10. A method comprising:
capturing, by a light sensor of an image capture device external to a computer, an image;
decoding, at the image capture device, the captured image into a sequence of characters that emulates indications of keypresses of keyboard keys;
recognizing, by a processor of the image capture device, at least one character in the sequence of characters that is interpretable by an operating system of the computer as a system level command to point a cursor generated by the operating system to a command line of the operating system to enable entry of a further one or more characters of the sequence of characters at the command line;
replacing, by the processor of the image capture device, the further one or more characters in the sequence of characters with a dummy code in response to the further one or more characters comprising a malicious command to prevent provision of the malicious command to the computer; and
transmitting the sequence of characters in a wrapper defined by a communication protocol with the further one or more characters replaced by the dummy code from the image capture device to a communication port of the computer in a manner that emulates a keyboard coupled to the computer, wherein:
the operating system is to be executed within the computer to support basic functions of the computer; and
the basic functions comprise interpretation of sequences of characters generated by a keyboard and received by the computer via the communication port of the computer.

11. The method of claim 10, wherein the dummy code comprises one or more characters that emulate data entered via keypresses of keyboard keys, and is not interpretable by the operating system of the computer as a system level command.

12. The method of claim 10, wherein the image capture device comprises:
a dongle in which the processor resides; and
a bar code scanner in which the light sensor resides, wherein the bar code scanner is configured to be coupled to the dongle.

13. The method of claim 12, wherein:
the decoding of the captured image into the sequence of characters occurs within the bar code scanner;
the sequence of characters is transmitted wirelessly by the bar code scanner to the dongle prior to the replacing of the at least one character; and
the replacing of the at least one character occurs within the dongle prior to the transmitting of the sequence of characters to the communication port of the computer.

14. The method of claim 10, wherein the image capture device comprises a transmitter to transmit the sequence of characters with the at least one character replaced by the dummy code from the image capture device to the communication port of the computer via a cable.

15. The method of claim 10, wherein:
the image capture device comprises a bar code scanner in which the light sensor resides;
the captured image comprises a first bar code captured by the light sensor; and
the method further comprises:
capturing, by the light sensor, a second bar code;
distinguishing, by the processor, the second bar code from the first bar code as providing a change in which system level commands of the operating system are filtered by the processor from sequences of characters transmitted to the communication port of the computer; and
ceasing to replace the at least one character in sequences of characters transmitted to the communication port in response to the provision of the change by the second bar code.

16. A method comprising:
capturing, by a light sensor of an image capture device external to a computer, an image;
decoding, at the image capture device, the captured image into a sequence of characters that emulates indications of keypresses of keyboard keys;
recognizing, by a processor of the image capture device, at least one character in the sequence of characters that is interpretable by an operating system of the computer as a system level command to point a cursor generated by the operating system to a command line of the operating system to enable entry of a further one or more characters of the sequence of characters at the command line;
allowing, by the processor, the at least one character to remain in the sequence of characters as transmitted in a wrapper defined by a communication protocol from the image capture device to a communication port of the computer; and
filtering, by the processor, the further one or more characters from the sequence of characters, prior to transmission of the sequence of characters from the image capture device to the communication port of the computer, in response to the further one or more characters comprising a malicious instruction to prevent provision of the malicious instruction to the computer, wherein:
the operating system is to be executed within the computer to support basic functions of the computer, and
the basic functions comprise interpretation of sequences of characters generated by a keyboard and received by the computer via the communication port of the computer.

17. The method of claim 16, wherein the malicious instruction comprises an instruction to access a malicious website.

18. The method of claim 16, wherein the malicious instruction directs the operating system to perform an operation selected from a group consisting of opening an email application to send a malicious email, delete at least one file stored in a storage device of the computer, and change an operating system setting.

19. The method of claim 16, wherein the image capture device comprises a bar code scanner in which the light sensor and the processor reside.

20. The method of claim 19, wherein the bar code scanner is configured to be coupled to the communication port of the computer via a cable.

21. The method of claim 20, wherein the communication port of the computer conforms to a specification selected from a group consisting of Universal Serial Bus (USB) and RS-232.

22. The method of claim 16, wherein:
the image capture device comprises a bar code scanner in which the light sensor resides;
the captured image comprises a first bar code captured by the light sensor; and
the method further comprises:
  capturing, by the light sensor, a second bar code;
  distinguishing, by the processor, the second bar code from the first bar code as providing a change in which characters are filtered by the processor from sequences of characters transmitted to the communication port of the computer; and
  ceasing to allow the at least one character to remain in sequences of characters transmitted to the communication port in response to the provision of the change by the second bar code.

* * * * *